US012610386B2

(12) United States Patent
Gulati et al.

(10) Patent No.: US 12,610,386 B2
(45) Date of Patent: Apr. 21, 2026

(54) ENABLING SIDELINK FULL DUPLEX COMMUNICATION

(71) Applicant: QUALCOMM Incorporated, San Diego, CA (US)

(72) Inventors: Kapil Gulati, Belle Mead, NJ (US); Hui Guo, Beijing (CN); Sourjya Dutta, San Diego, CA (US); Shuanshuan Wu, San Diego, CA (US); Anantharaman Balasubramanian, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 342 days.

(21) Appl. No.: 18/039,477

(22) PCT Filed: Feb. 1, 2021

(86) PCT No.: PCT/CN2021/074615
§ 371 (c)(1),
(2) Date: May 30, 2023

(87) PCT Pub. No.: WO2022/160329
PCT Pub. Date: Aug. 4, 2022

(65) Prior Publication Data
US 2024/0023150 A1     Jan. 18, 2024

(51) Int. Cl.
*H04W 72/541*      (2023.01)
*H04L 5/14*      (2006.01)
*H04W 72/25*      (2023.01)

(52) U.S. Cl.
CPC ............. *H04W 72/541* (2023.01); *H04L 5/14* (2013.01); *H04W 72/25* (2023.01)

(58) Field of Classification Search
CPC .................................................. H04W 72/541
See application file for complete search history.

(56) References Cited

U.S. PATENT DOCUMENTS

| | | | |
|---|---|---|---|
| 2017/0071004 A1 | 3/2017 | Noh et al. | |
| 2022/0078818 A1* | 3/2022 | Sun ....................... | H04W 72/23 |
| 2022/0182160 A1* | 6/2022 | Su ........................ | H04B 17/309 |

FOREIGN PATENT DOCUMENTS

| | | |
|---|---|---|
| CN | 109314983 A | 2/2019 |
| CN | 111867089 A | 10/2020 |

(Continued)

OTHER PUBLICATIONS

International Search Report and Written Opinion—PCT/CN2021/074615—ISA/EPO—Oct. 27, 2021.

(Continued)

*Primary Examiner* — Abdeltif Ajid
(74) *Attorney, Agent, or Firm* — QUALCOMM Incorporated

(57) ABSTRACT

The apparatus may be a base station configured to receive a request for resources for transmission of a first SL communication; to determine one or more destination IDs associated with the transmission of the first SL communication; to determine, based on the one or more determined destination IDs, a set of resources that support FD SL communications by the requesting UE; and to transmit, based on the determined set of resources, a resource grant to the requesting UE for transmission of the first SL communication. The apparatus may be a UE configured to transmit a request for resources for transmission of a SL communication and an indication of at least one destination ID associated with at least one SL communication received at the UE to the base station; and to receive, from the base station, a SL resource grant based on the transmitted request and indication.

16 Claims, 11 Drawing Sheets

(56)     References Cited

FOREIGN PATENT DOCUMENTS

| KR | 102201479 B1 * | 1/2021 | ............ H04W 88/08 |
| WO | 2019142512 A1 | 7/2019 | |
| WO | 2020142903 A1 | 7/2020 | |

OTHER PUBLICATIONS

Supplementary European Search Report—EP21921929—Search Authority—The Hague—Sep. 16, 2024.

* cited by examiner

FIG. 6

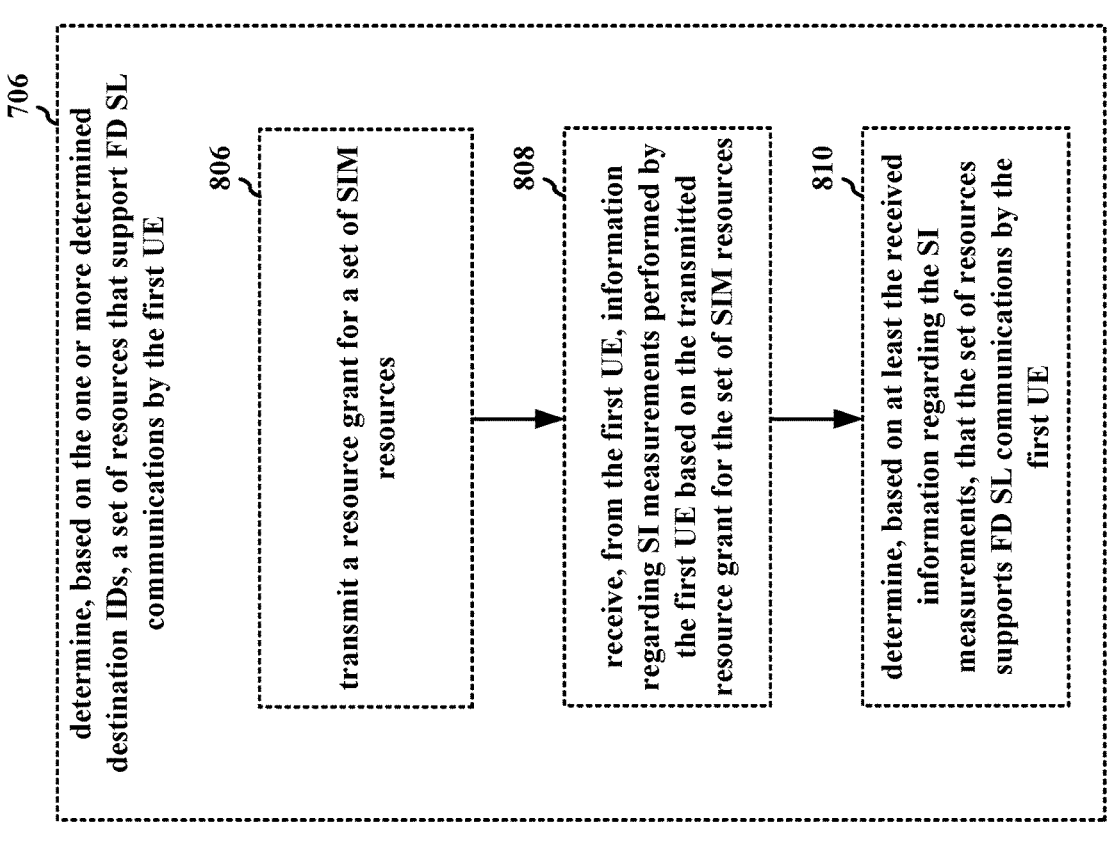

706 determine, based on the one or more determined destination IDs, a set of resources that support FD SL communications by the first UE

806 transmit a resource grant for a set of SIM resources

808 receive, from the first UE, information regarding SI measurements performed by the first UE based on the transmitted resource grant for the set of SIM resources

810 determine, based on at least the received information regarding the SI measurements, that the set of resources supports FD SL communications by the first UE

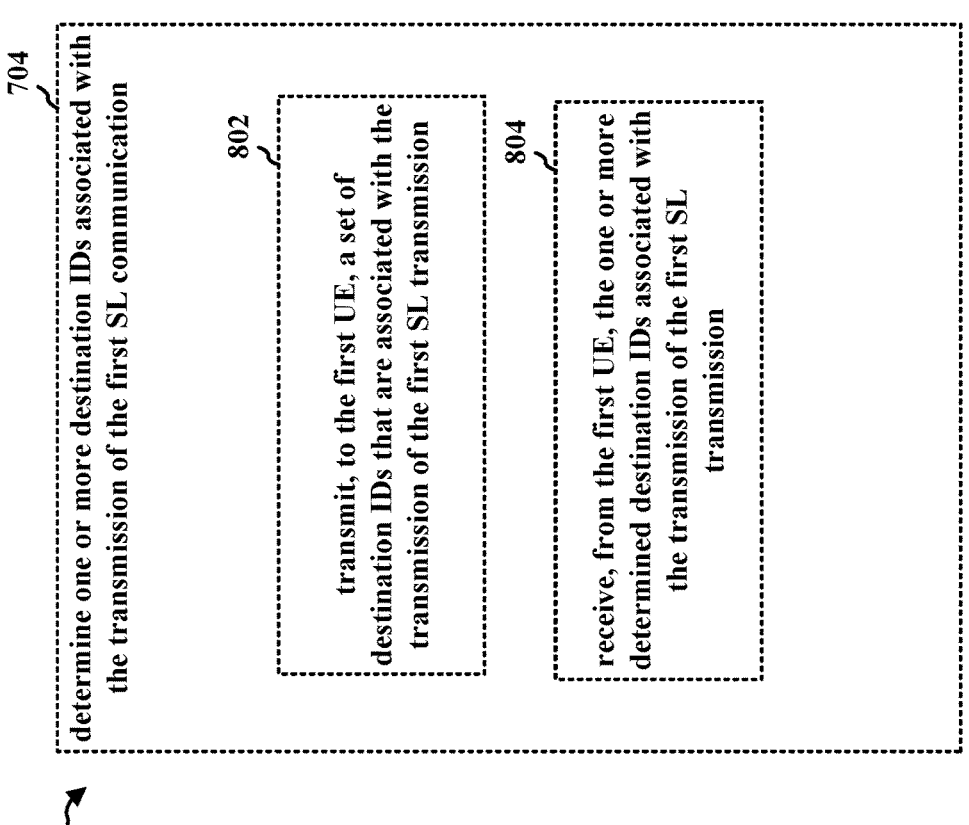

704 determine one or more destination IDs associated with the transmission of the first SL communication

802 transmit, to the first UE, a set of destination IDs that are associated with the transmission of the first SL transmission

804 receive, from the first UE, the one or more determined destination IDs associated with the transmission of the first SL transmission

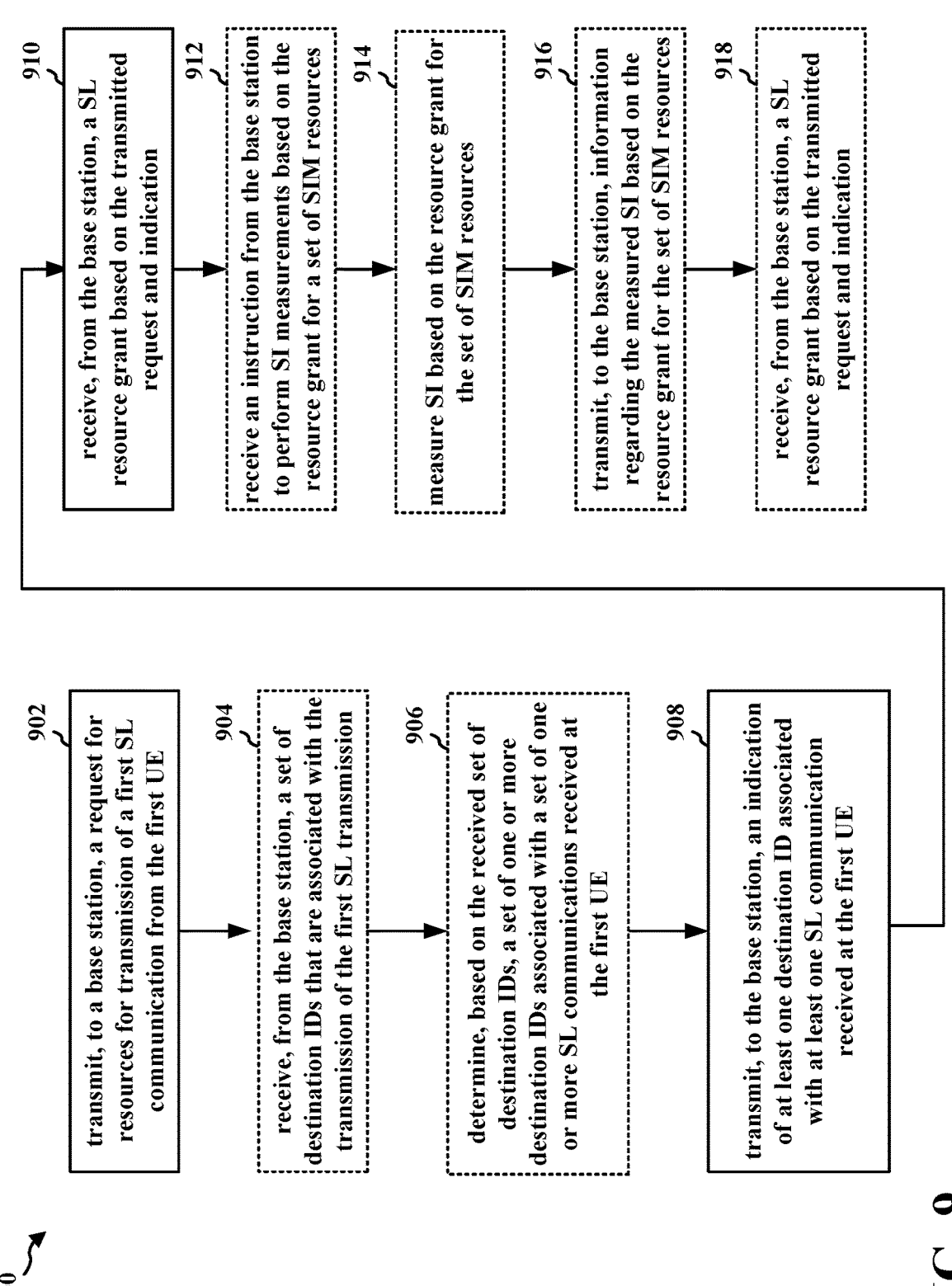

900

910 — receive, from the base station, a SL resource grant based on the transmitted request and indication 912 — receive an instruction from the base station to perform SI measurements based on the resource grant for a set of SIM resources 914 — measure SI based on the resource grant for the set of SIM resources 916 — transmit, to the base station, information regarding the measured SI based on the resource grant for the set of SIM resources 918 — receive, from the base station, a SL resource grant based on the transmitted request and indication 902 — transmit, to a base station, a request for resources for transmission of a first SL communication from the first UE 904 — receive, from the base station, a set of destination IDs that are associated with the transmission of the first SL transmission 906 — determine, based on the received set of destination IDs, a set of one or more destination IDs associated with a set of one or more SL communications received at the first UE 908 — transmit, to the base station, an indication of at least one destination ID associated with at least one SL communication received at the first UE

FIG. 9

ENABLING SIDELINK FULL DUPLEX COMMUNICATION

CROSS REFERENCE TO RELATED APPLICATION(S)

This application is a National Stage Application filed under 35 U.S.C. § 371 of PCT International Application No. PCT/CN2021/074615, entitled "ENABLING SIDELINK FULL DUPLEX COMMUNICATION" and filed Feb. 1, 2021, which is expressly incorporated by reference herein in its entirety.

BACKGROUND

Technical Field

The present disclosure relates generally to communication systems, and more particularly, to granting sidelink (SL) resources for full duplex (FD) SL communication.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

For user equipments (UEs) with multiple transmission and reception points (multi-TRP or mTRP), there are challenges to performing FD communications. For example, a transmission by a first TRP in a set of mTRP of a particular UE may interfere with reception at another TRP in the set of mTRP at the same time or a same time and frequency. For UEs such as a vehicle that may extend in space over a relatively large distance, it may be possible to have at least two TRPs of an mTRP configuration that are separated by enough distance to allow FD SL communication by the UE.

In an aspect of the disclosure, a method, a computer-readable medium, and an apparatus are provided. The apparatus may be a first device at a base station. The first device may be a processor and/or modem at the base station or the base station itself. The base station may be configured to receive, from a first UE, a request for resources for transmission of a first SL communication. The base station may further be configured to determine one or more destination identifiers (IDs) associated with the transmission of the first SL communication. The base station may also be configured to determine, based on the one or more determined destination IDs, a set of resources that support FD SL communications by the first UE. The base station may further be configured to transmit, based on the determined set of resources, a resource grant to the first UE for transmission of the first SL communication. The resource grant may include at least one resource of the determined set of resources. The base station may further be configured to determine the one or more destination IDs associated with the transmission of the first SL communication by transmitting, to the first UE, a set of destination IDs that are associated with the transmission of the first SL transmission and receiving, from the first UE, the one or more determined destination IDs associated with the transmission of the first SL transmission.

In an aspect of the disclosure, a method, a computer-readable medium, and an apparatus are provided. The apparatus may be a second device at a first UE. The second device may be a processor and/or modem at the first UE or the first UE itself. The first UE may be configured to transmit a request for resources for transmission of a first SL communication to the base station. The first UE may further be configured to transmit an indication of at least one destination ID associated with at least one SL communication received at the first UE to the base station. The first UE may also be configured to receive, from the base station, a SL resource grant based on the transmitted request and indication. The first UE, in some aspects, may further be configured to receive, from the base station, a set of destination IDs that are associated with the transmission of the first SL transmission and determine, based on the received set of destination IDs, a set of one or more destination IDs associated with a set of one or more SL communications received at the first UE. The set of one or more determined destination IDs, in some aspects, may be a subset of the destination IDs in the received set of destination IDs and the indicated at least one destination ID is a destination ID in the set of one or more determined destination IDs.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 is a diagram illustrating the contents of a SL SIM resource grant.

FIG. 8 is a diagram including expanded flowcharts for steps of FIG. 7.

FIG. 9 is a flowchart of a method of wireless communication.

DETAILED DESCRIPTION

Figure 1:
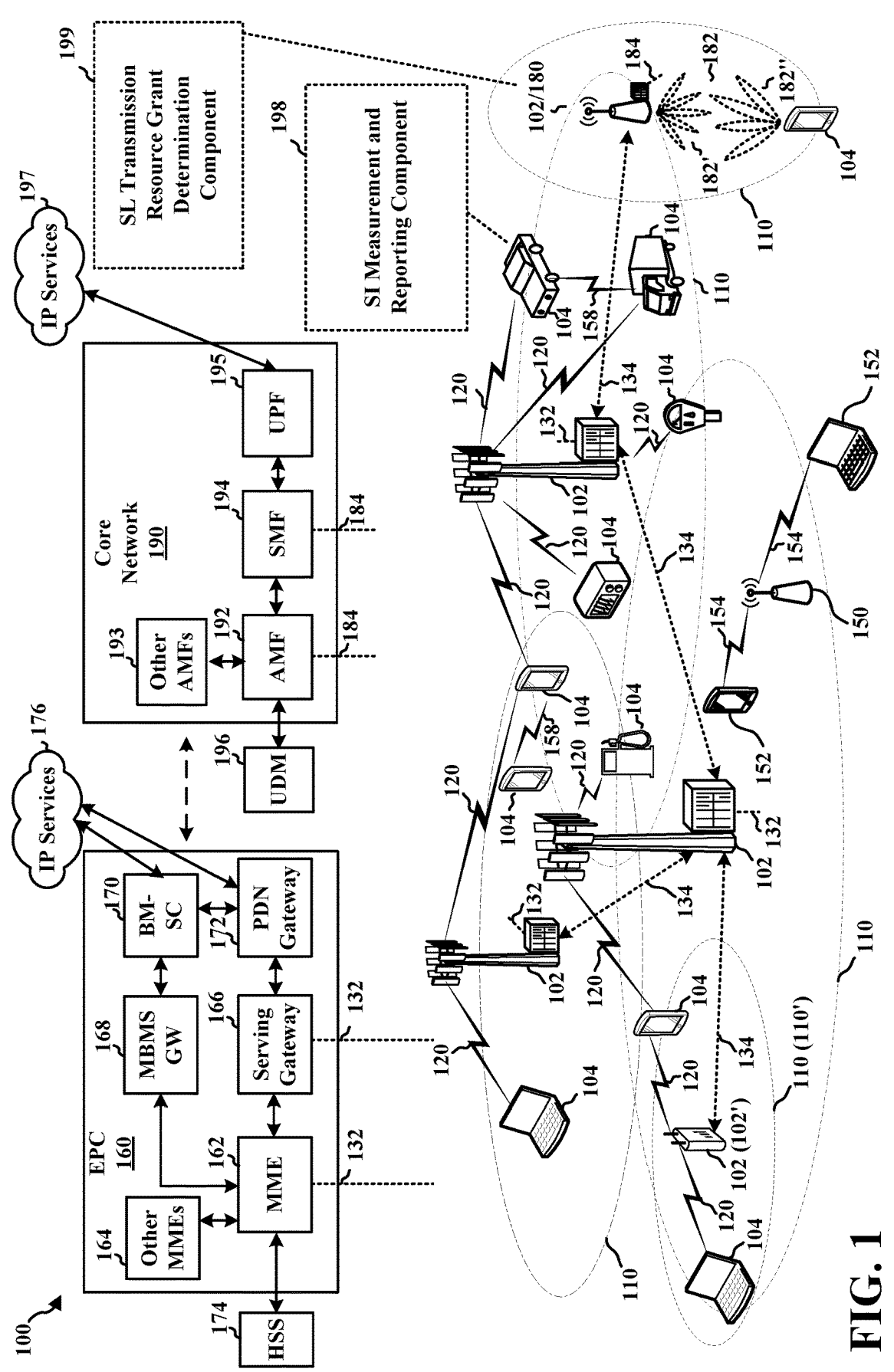
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may include SI measurement and reporting component 198 that may be configured to transmit, to a base station, a request for resources for transmission of a first SL communication from the first UE; transmit, to the base station, an indication of at least one destination ID associated with at least one SL communication received at the first UE; and receive, from the base station, a SL resource grant based on the transmitted request and indication. In certain aspects, the base station 180 may include SL transmission resource grant determination component 199 that may be configured to receive, from a first UE a request for resources for transmission of a first SL communication; determine one or more destination IDs associated with the transmission of the first SL communication; determine, based on the one or more determined destination IDs, a set of resources that support FD SL communications by the first UE; and transmit, based on the determined set of resources, a resource grant to the first UE for transmission of the first SL communication, the resource grant comprising at least one resource of the determined set of resources. Although the following description may be focused on 5G NR, the concepts described herein may be applicable to other similar areas, such as LTE, LTE-A, CDMA, GSM, and other wireless technologies.

Figure 2:
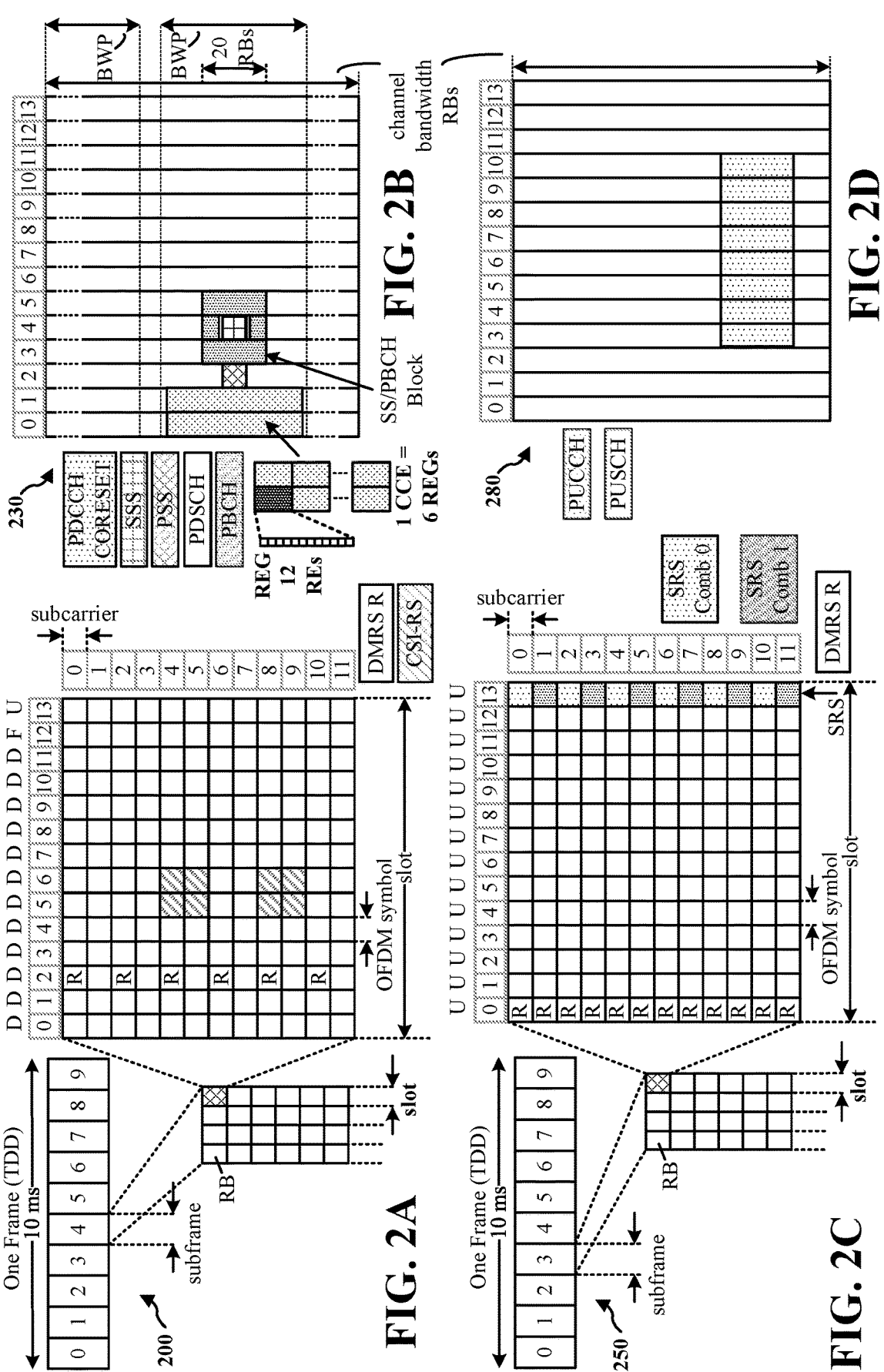
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology p, there are 14 symbols/slot and 2 slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) information (ACK/negative ACK (NACK)) feedback. The PUSCH carries data, and may additionally be used to carry a buffer status report (BSR), a power headroom report (PHR), and/or UCI.

Figure 3:
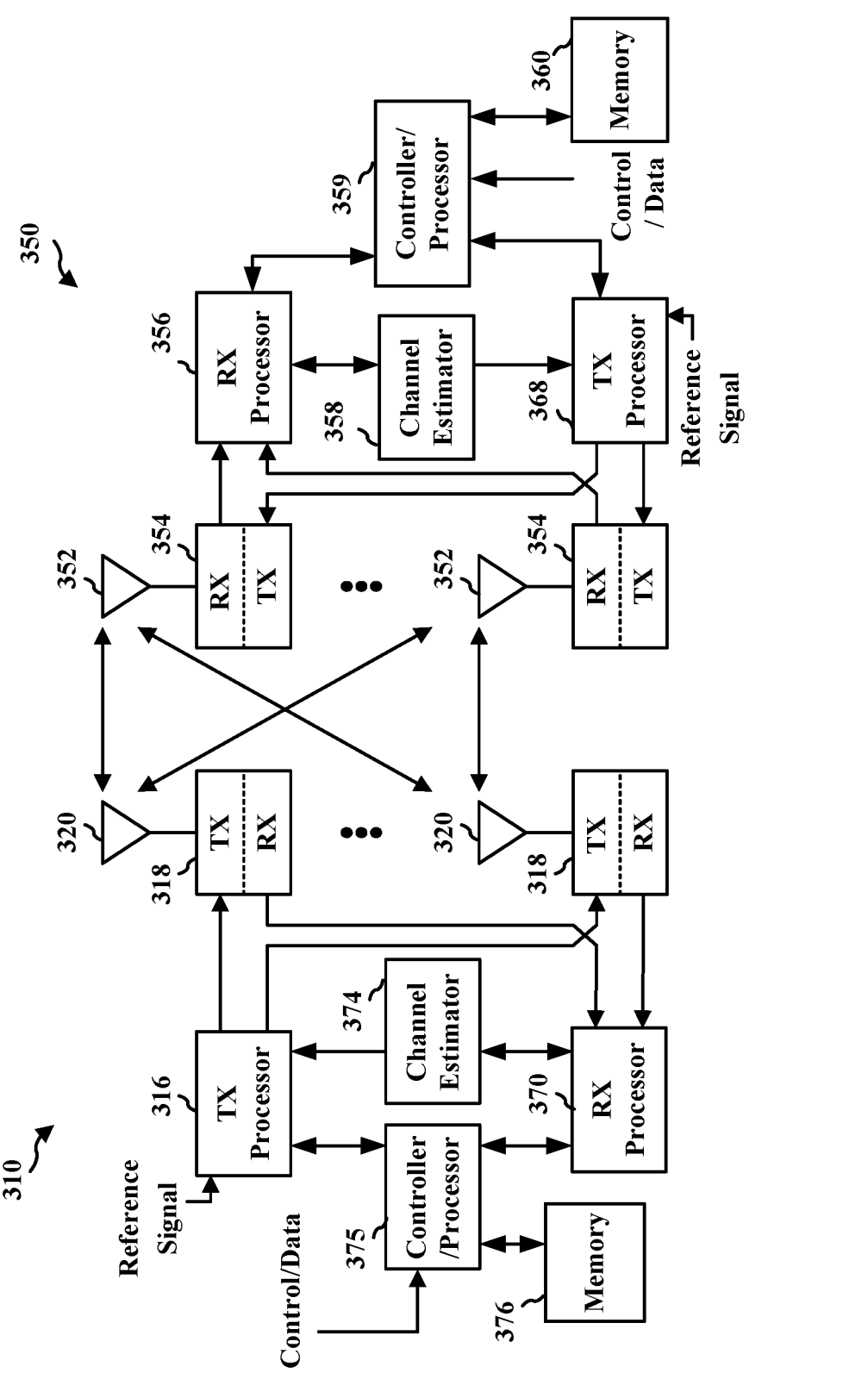
FIG. 3 is a diagram illustrating an example of a base station and UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354 TX. Each transmitter 354 TX may modulate an RF carrier with a respective spatial stream for transmission.

The UL transmission is processed at the base station 310 in a manner similar to that described in connection with the receiver function at the UE 350. Each receiver 318 RX receives a signal through its respective antenna 320. Each receiver 318 RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1. At least one of the TX processor 316, the RX processor 370, and the controller/processor 375 may be configured to perform aspects in connection with 199 of FIG. 1.

In some aspects of wireless communication, e.g., 5G NR, UEs with mTRP are employed to improve reliability, coverage, and capacity performance through flexible deployment scenarios. More specifically, mTRP equipped in different parts of vehicles (as an example of a UE with a mTRP configuration having at least two TRPs separated by a distance of approximately 4-5 meters) may improve reliability in safety and other applications for which high robustness is desired. For some types of transmissions, data coverage may be biased, for example, side coverage may not be as important in certain cases as front or back coverage. Additionally, front, back, or 360-degree coverage may be dependent on packet content/type. For some types of reception, it may be beneficial to have 360-degree coverage which may be achieved by using a first TRP at one end of the vehicle (e.g., a front end) and a second TRP at another end of the vehicle (e.g., a back end) for reception from other UEs.

FD communication can double a link capacity theoretically by enabling radio network nodes to transmit and receive simultaneously on the same frequency and time radio resource. FD may be contrasted with half duplex (HD) communication for which transmission and reception may differ in at least one of time or frequency. Accordingly, a FD network node (e.g., a base station or UE in the cellular network) can communicate simultaneously in uplink (UL) and downlink (DL) with two half-duplex panels (e.g., two TRPs of an mTRP configuration) using the same radio resources (radio resources overlapping in time and frequency).

In vehicle-to-anything (V2X) communications, a vehicle equipped with mTRP that is capable of simultaneous transmission and reception using the same time-and-frequency radio resource may be referred to as a FD-capable UE, and can work in both FD mode and HD mode. However, in FD communication, a UE (e.g., vehicle) may experience self-interference (SI) that may reduce a signal-to-interference and noise ratio (SINR) in two ways: (1) by receiving signal directly from the transmitting panel at the reception panel and/or (2) by receiving signal indirectly from the transmitting panel at the reception panel (which may be referred to as cluster interference) due to reflections from surrounding objects. Accordingly, a FD-capable UE may not always operate in FD mode if the SI is too large.

For SL resources allocated by a base station or gNB (e.g., SL allocation mode 1) a base station receiving a SL BSR or scheduling request (SR) from a transmitting UE may allocate SL resources (e.g., n SL grant) based on the SL-BSR or SR. The base station may then transmit the SL grant via downlink control information (DCI) to the requesting UE. However, the base station SL resource grant may not be aware of which UEs (or transmission from UEs) the requesting UE is receiving from (or monitoring) or the intended recipients of the transmission (e.g., UE identities and/or locations). Accordingly, the SL resource grant may conflict with a different SL resource grant to a UE that is an intended recipient of the SL transmission from the requesting UE or that conflicts with a different SL resource grant to a UE that is transmitting to the requesting UE.

Figure 4:
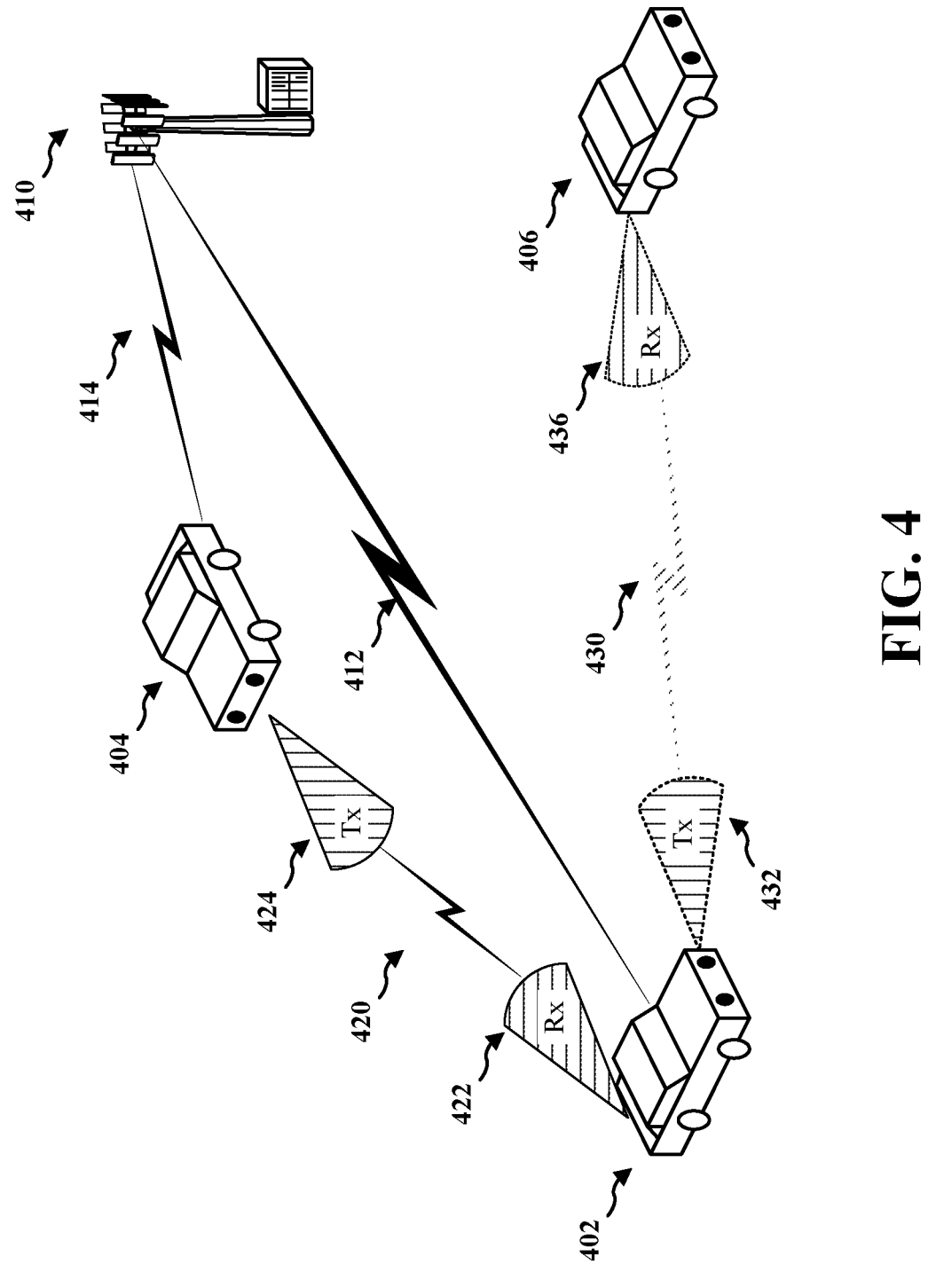
FIG. 4 is a diagram illustrating a set of UEs with multiple attempting to establish a SL communication.

FIG. 4 is a diagram 400 illustrating a set of UEs 402-406 with multiple TRPs (e.g., a rear TRP and a front TRP) attempting to establish SL communication 430. UE 402 is receiving transmissions from UE 404 (e.g., as part of communication 420 using receive beam 422 and transmit beam 424) and requesting a SL resource grant for communication 430 that uses transmit beam 432 and receive beam 436. As shown, UEs 402 and 404 may be connected (e.g., as indicated by connection 412 and 414) to base station 410, while UE 406 may not be connected to base station 410. The base station and UE may perform operations that will be discussed in relation to FIGS. 5-8.

To determine if FD communication (e.g., single frequency FD (SFFD) or sub-band FD) is feasible at the requesting UE 402 (e.g., if a UE can receive from UE 404 and transmit to UE 406 using a same set of time (sub-band FD) or time- and frequency (SFFD) resources), the base station 410 may use information regarding transmissions the requesting UE 402 is receiving (e.g., monitoring/decoding) and the amount of SI experienced compared to the signal strength for the received (e.g., monitored) transmissions.

Figure 5:
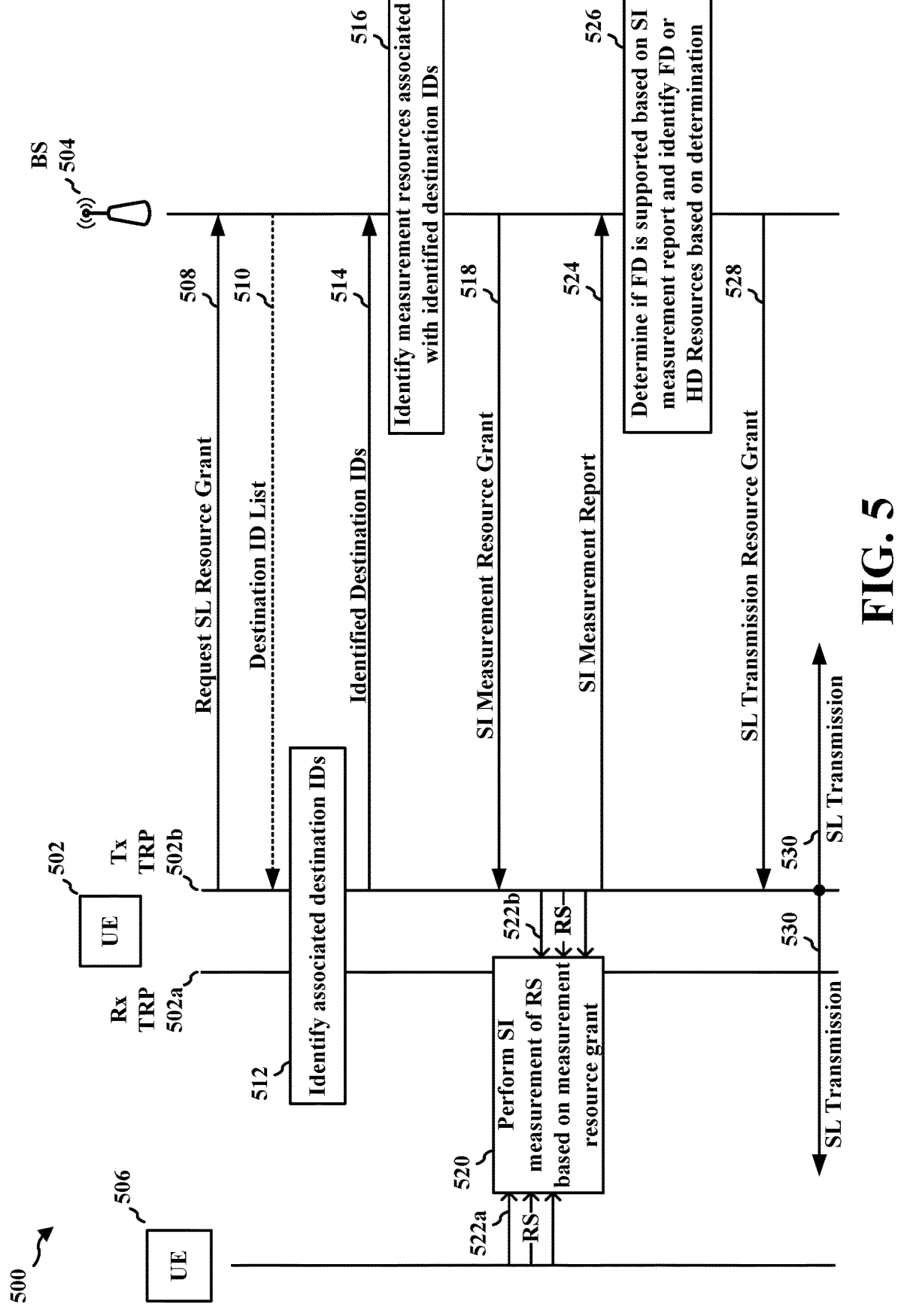
FIG. 5 is a call flow diagram illustrating communications between a UE requesting a SL transmission grant from base station as part of a SL resource grant operation.

FIG. 5 is a call flow diagram 500 illustrating communications between a UE 502 requesting a SL transmission grant from base station 504 station as part of a SL resource grant operation. The UE 502 may also receive SL communications from UE 506. For example, UE 502 may correspond to UE 402 of FIG. 4, with UE 506 corresponding to UE 404 and base station 504 corresponding to base station 410 of FIG. 4. Optional elements are indicated by dotted lines. UE 502 may include a reception (Rx) TRP 502*a* on which it receives/monitors transmissions from at least UE 506 and a transmission (Tx) TRP 502*b* from which it will transmit the transmission that is the subject of a request 508 for resources. UE 502 may transmit a SL resource grant request 508 for a SL transmission from UE 502 (e.g., from transmission TRP 502*b* to another UE). For example, referring to FIG. 4, SL resource grant request 508 may relate to the communication 430 between UE 402 and UE 406 using beams 432 and 436.

The base station 504 may receive SL resource grant request 508 and transmit a list of destination IDs 510 (e.g., a list of UEs known to be transmitting signals that the requesting UE 502 may be receiving). The base station 504 may transmit, and UE 502 may receive, the list of destination IDs 510 via RRC signaling. The list of destination IDs 510 may be based on previous resource grants and resource releases known to the base station 504. The destination IDs may be UE-specific such that a particular UE is associated with a particular destination ID. Alternatively, or additionally, the destination IDs may be transmission-specific such that each different SL resource grant is associated with a different destination ID. For example, referring to FIG. 4, the list of destination IDs 510 sent from base station 410 to UE 402 over connection 412 may include at least a destination ID associated with UE 404 and/or with communication 420. Transmitting the list of destination IDs 510 may be omitted in some configurations in which the base station maintains a list of destination IDs associated with connected UEs semi-statically as will be discussed below in relation to identifying 512 associated destination IDs and transmitting identified destination IDs 514.

The UE 502 may receive the list of destination IDs and identify 512 the destination IDs associated with transmissions received (e.g., monitored and/or decoded) by UE 502 (e.g., at reception TRP 502*a*). Additionally, or alternatively, each time the UE 502 begins to receive/monitor a transmission, the UE 502 may identify a destination ID associated with the received/monitored transmissions. The UE 502 may also identify a destination ID associated with a particular transmission each time the UE 502 stops receiving/monitoring the particular transmission.

The UE 502 may then transmit a set of destination IDs 514 identified as being associated with transmissions received by the UE 502. The UE 502 may transmit the set of destination IDs 514 identified as being associated with transmissions received by the UE 502 base station 504 via RRC signaling. The set of destination IDs 514 identified as being associated with transmissions received by the UE 502 (and specifically reception TRP 502*a*) may be based on the list of destination IDs 510 or based on beginning or ending the reception/monitoring of a particular transmission. In response to a received list of destination IDs, the set of destination IDs 514 may be generated as a new list of destination IDs associated with the transmissions received by the UE 502. Alternatively, the UE may transmit the identified destination IDs 514 as a list of binary values indicating whether or not the UE 502 (and specifically reception TRP 502*a*) is receiving transmissions associated with a corresponding destination ID in the list of destination IDs 510.

The base station 504 may receive the identified destination IDs 514 and identify 516 resources that may be used to measure self-interference at the UE. The base station 504 may identify 516 resources that may be used to measure self-interference based on information regarding the identified destination IDs 514. The information may include time and frequency resources granted to the UE associated with the destination IDs as well as directionality (e.g., indicated by a transmission configuration indicator (TCI) state) associated with a receive beam (e.g., used by reception TRP 502*a*) or a transmit beam of UE 506. For example, referring to FIG. 4, the directionality of beam 422/424 may be identified based on a destination ID associated with one of UE 404, UE 402, or communication 420.

Based on the identification 516 of the resources that may be used to measure self-interference, the base station 504 may transmit a SL measurement grant 518. The SL measurement resource grant 518 may be referred to as a SL SIM resource grant and may identify resources that may be referred to as SI measurement (SIM) resources. The SL SIM resource grant 518 may identify any combination of (1) a set of transmission resources for transmitting from the transmission TRP 502*b* (and corresponding interference measurement resources (IMR) specifying resources for receiving the transmissions and measuring the interference at the reception TRP 502*a*), (2) a set of channel measurement resources (CMR) for measuring the strength of a received (e.g., at reception TRP 502*a*) transmission (e.g., signal) associated with at least one destination ID in the set of identified destination IDs 514, and/or (3) a set of TCI states associated with the transmission, the IMR, and/or the CMR.

The UE 502 may receive the SL SIM resource grant 518 and perform 520 SI measurements on reference signals 522*a* (e.g., from the destination ID UE 506) and 522*b* (e.g., from transmission TRP 502*b*) based on the SL SIM resource grant. The reception TRP 502*a* may receive reference signals 522*a* from the UE 506 and the reference signals 522*b* from the transmission TRP 502*b* using different resources in time or both time and frequency to measure (1) a signal strength for the reference signals 522*a* from the UE 506 without the interference from transmission TRP 502*b* and (2) an interference signal strength from the transmissions 522*b* from transmission TRP 502*b* without other confounding signals. Additionally, SI measurements may be made regarding the set of reference signals 522*b* using different frequency resources at a same time resource to determine if sub-band FD is possible (e.g., if there is interference between transmissions using different allocable frequency resources such as carriers, subcarriers, channels, etc.).

After measuring the reference signals 522*a* and 522*b* at reception TRP 502*a*, the UE 502 may transmit the measurement results to base station 504 in a SI measurement report 524. The SI measurement report 524 may include a measured reference signal received power (RSRP) on the identified IMR and CMR, and a measured SINR using CMR as the desired SL "signal" and IMR as the interference. The base station 504 may receive the SIM measurement report 524.

Based on the SIM measurement report 524, the base station 504 may determine 526 whether FD (SFFD or sub-band FD) operation is possible for the transmission that is the subject of request 508. Based on the determination, the base station 504 may identify 526 resources for transmission in one of a FD or HD mode of operations. For example, if the interference is determined to be below a threshold, a set of resources for a FD mode of operation may be identified for the transmission that is the subject of the request 508. However, if the interference is determined to be above a threshold, a set of resources for a HD mode of operation may be identified for the transmission that is the subject of the request 508. In some aspects, the threshold for a RSRP of IMR is defined in relation to a reported RSRP of CMR (e.g., a threshold RSRP for IMR that is defined as being one-tenth of a measured RSRP for CMR). In some aspects, the threshold is defined based on a measurement of the quality of the reception from another UE (e.g., UE 506) in the presence of the interference (e.g., based on a measured reference signal received quality (RSRQ) or SINR).

The base station may transmit the identified 526 resources (e.g., FD or HD time-and-frequency resources) as SL transmission resource grant 528. The resource grant may identify a set of resources to use for the transmission that was the subject of request 508. The UE 502 may receive the SL transmission resource grant 528 and transmit SL transmissions 530 from transmission TRP 502*b* based on the resources identified in the SL transmission resource grant 528.

Figure 6:
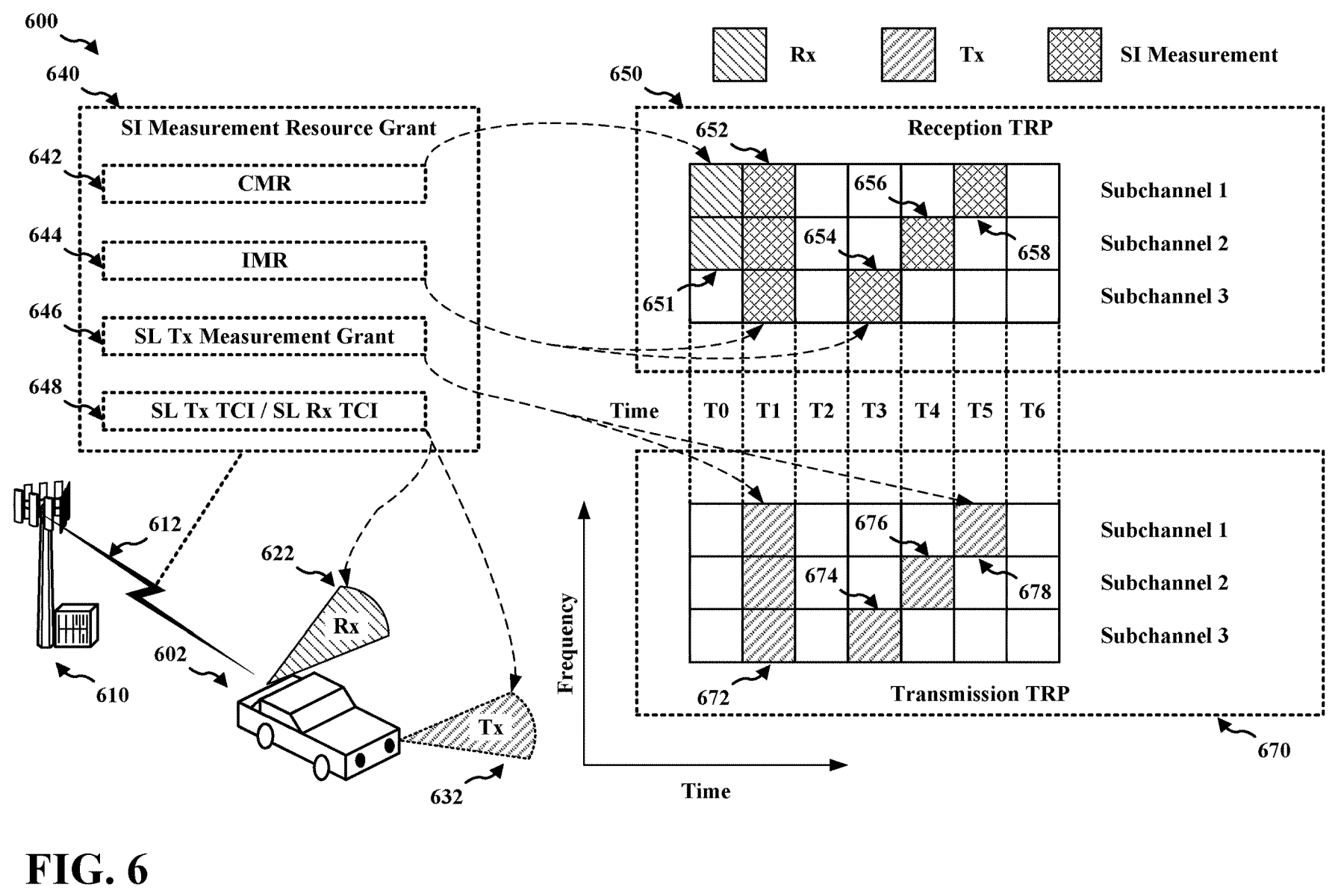

FIG. 6 is a diagram 600 illustrating the contents of a SL SIM resource grant 640. FIG. 6 illustrates a UE 602 with a first reception TRP 650 associated with receive beam 622 and a second transmission TRP 670 associated with transmit beam 632. UE 602 may have established a connection 612 with base station 610. UE 602 may receive a SI measurement resource grant 640 from the base station 610 over connection 612. FIG. 6 illustrates the contents of a SI SIM resource grant 640 that, in some aspects, corresponds to SI measurement resource grant 518 of FIG. 5. The SL SIM resource grant 640 may include CMR information 642; IMR information 644; SL transmission measurement grant 646; and/or beam directionality information in SL transmission TCI and SL reception TCI 648.

The CMR information 642 may indicate a set of resources 651 in time and frequency at which to measure the reference signal strength (e.g., the RSRP) at reception TRP 650. The indicated resources may not overlap in time with transmissions from transmission TRP 670 (e.g., transmissions 672-678), so as to obtain an accurate baseline measurement of the reference signal strength without any interference from the transmissions from transmission TRP 670. In some aspects, the CMR may also identify time and frequency elements that overlap with the transmissions from transmission TRP 670 to measure the RSRQ of the transmissions received from a different UE (e.g., UE 404 or UE 506 of FIGS. 4 and 5).

The IMR information 644 may indicate a set of resources 652-658 in time and frequency at which to measure the reference signal strength (e.g., the RSRP) of the potentially interfering transmissions from transmission TRP 670 (e.g., transmission 672-678) at reception TRP 650. The indicated resources 652-658 in time and frequency may include a first set of resources 652 that share a time and span multiple allocable frequencies to measure cross channel interference. The indicated resources 652-658 in time and frequency may also include a second set of resources 654-658 that share neither a time or a frequency to distinguish cross channel interference from interference from a transmission over a same channel (frequency). In some aspects, the resources indicated in the IMR information 644 may include a set of resources that overlap (e.g., in frequency) with reference signal resources associated with the transmissions received from a different UE and a set of resources that do not overlap (e.g., in either frequency or time) with reference signal resources associated with the transmissions received from the different UE to measure the interference under the two different interference conditions.

The SL transmission measurement grant 646 may indicate a set of resources 672-678 in time and frequency over which to transmit SL transmissions from transmission TRP 670. The SL transmission measurement grant 646, in some aspects, includes the same time and frequency resources 652-658 identified in the IMR information 644. For example, transmission resources 672-678 share the same time-and-frequency resources with the IMR (e.g., resources 652-658) in order to measure RSRP during the time, and on the frequencies, on which the transmission TRP 670 is transmitting.

The beam directionality information in SL transmission TCI and SL reception TCI 648 may include first and second TCI of a type (e.g., type D) that indicates a quasi-co-located (QCL) beam that shares a directionality. The first TCI may be a SL transmission TCI indicating the directionality of the transmission from transmission TRP 670. The second TCI may be a SL reception TCI indicating the directionality of the reception at reception TRP 650. In some aspects, the beam directionality may be identified based on a destination ID or a previously configured directionality (e.g., TCI state) for SL transmission. Based on the measurements made for the identified resources (e.g., 651-658) using the identified beam configurations (e.g., beam directions associated with beams 622 and 632), the UE 602 may generate a measurement report and transmit the measurement report to the base station 610. For example, referring to FIG. 5, UE 502 may perform 520 the CMR and SI measurements and transmit SI measurement report 524.

Figure 7:
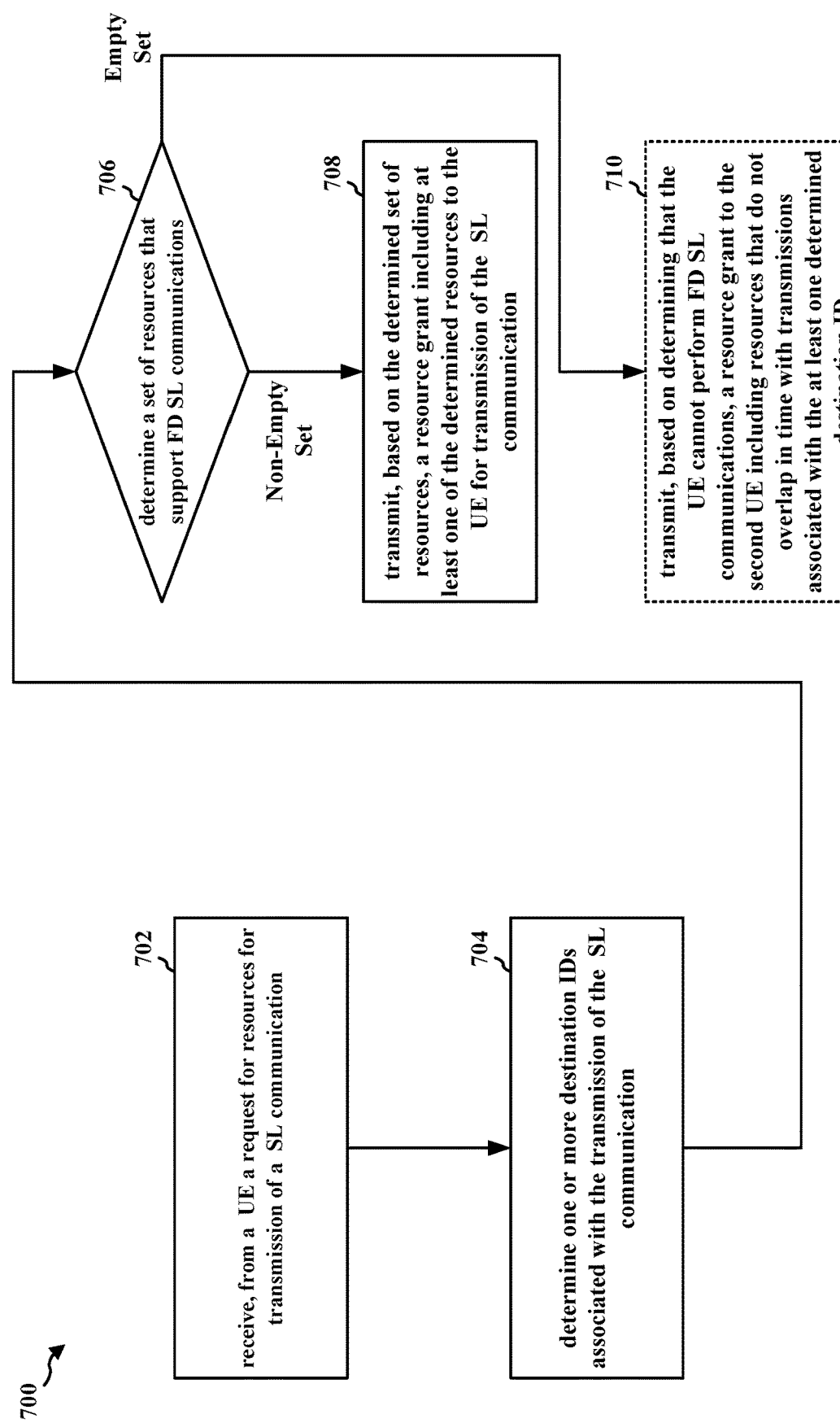
FIG. 7 is a flowchart of a method of wireless communication.

FIG. 7 is a flowchart 700 of a method of wireless communication. FIG. 8 is a diagram 800 including expanded flowcharts for steps 704 and 706 of FIG. 7. The method may be performed by a base station (e.g., the base station 102/180/410/504/610; the apparatus 1102). At 702, the base station may receive, from a first UE a request for resources for transmission of a first SL communication. The request may include TCI state or other directionality information. For example, 702 may be performed by destination ID association determination component 1140 (e.g., via reception component 1130) of FIG. 11. For example, referring to FIG. 5, base station 504 may receive SL resource grant request 508 from UE 502.

At 704, the base station may determine one or more destination IDs associated with the transmission of the first SL communication. Referring to FIG. 8, in order to determine the one or more destination IDs, in some aspects, the base station may, at 802, transmit, to the first UE, a set of destination IDs that are associated with the transmission of the first SL transmission. The base station may transmit, and UE may receive, the list of destination IDs via RRC signaling. The set of destination IDs that are associated with the transmission of the first SL transmission may include destination IDs associated with SL transmission grants made by the base station (e.g., base station 504; apparatus 1102) that have not been subsequently released. The destination IDs, in some aspects, are used to identify transmissions which the first (requesting) UE (e.g., UE 402/502/602; apparatus 1002) may be receiving (or monitoring). The base station may also receive, at 804, the one or more determined destination IDs associated with the transmission of the first SL transmission from the first UE.

In some aspects in which the base station (e.g., 504; apparatus 1102) maintains a semi-static list of destination IDs associated with each connected UE (e.g., UE 502 and/or UE 506), the base station may receive, at 804, the one or more determined destination IDs without transmitting the set of destination IDs. For example, as described in relation to FIG. 5, the UE 502 may identify a destination ID associated with a particular transmission each time the UE 502 begins to receive/monitor the particular transmission. The UE 502 may transmit the identified destination ID as an identified destination ID 514 and the base station 504 may receive the identified destination ID 514 transmission. The base station 504 may then add the identified destination ID 514 to a semi-static list of destination IDs associated with UE 502. The UE 502 may also identify a destination ID associated with a particular transmission each time the UE 502 stops receiving/monitoring the particular transmission. The UE 502 may transmit the identified destination ID as an identified destination ID 514 indicating that the transmission associated with the identified destination ID is no longer being received/monitored by UE 502. The base station 504 may receive the identified destination ID 514 transmission and remove the identified destination ID 514 from the semi-static list of destination IDs associated with the UE 502 from which the identified destination ID 514 transmission was received. For example, 704 (and the sub-steps 802 and 804) may be performed by destination ID association determination component 1140 of FIG. 11.

At 706, the base station may determine, based on the one or more determined destination IDs, a set of resources that support FD SL communications by the first UE. In order to determine the set of resources that support FD SL communications by the first UE, in some aspects, the base station may, at 806, transmit a resource grant for a set of SIM resources. The resource grant for the set of SIM resources may include CMR information, IMR information, a SL transmission measurement grant, and directionality (e.g., TCI state) information relating to the CMR, the IMR, and/or the transmission measurement grant resources. For example, referring to FIGS. 5 and 6, the base station 504 (or 610) may transmit SIM resource grant 518 (or 640). The transmitted SIM resource grant 640 may include CMR information 642; IMR information 644; SL transmission measurement grant 646; and/or beam directionality information in SL transmission TCI (state) and SL reception TCI (state) 648. For example, 706 (and sub-step 806) may be performed by one of a SIM resource identification component 1142 or a SL transmission resource grant determination component 1144 of FIG. 11.

The base station, based on the transmitted SIM resource grant transmitted, at 806, to the first UE, may receive, at 808, information regarding SI measurements performed by the first UE. The information may be received from the first UE and may include a measured RSRP on the identified IMR and CMR, and a measured SINR using CMR as the desired SL "signal" and IMR as the interference. For example, referring to FIGS. 5 and 6, the base station 504 (or 610) may receive the SIM measurement report 524 regarding SI measurements performed by the UE 502 (or 602) may be based on the transmitted SI measurement resource grant 518 (or 640), including CMR 642 and IMR 644. For example, 808 may be performed (e.g., via reception component 1130) by a SIM resource identification component 1142 of FIG. 11.

Based on the received SIM information, the base station may, at 810, determine a set of resources (e.g., the set (or a subset) of resources identified by the SI measurement resource grant) that supports FD (e.g., SFFD or sub-band FD) SL communications by the first UE. Additionally, or alternatively, the base station, at 810, may determine that the transmission associated with the received request for transmission resources does not interfere with reception of a particular transmission (or set of transmissions) from a different UE (or set of different UEs) received (or monitored) at the first UE. The determination, at 810, may be based on the identified destination IDs (used to identify CMR, IMR and TCI information for inclusion in a SI measurement resource grant) as well as the received information regarding the measurements made by the requesting UE.

For example, referring to FIGS. 5 and 6, a UE 502 or 602 may measure (1) RSRP and/or RSRQ for resources 651 identified by the CMR information, (2) RSRP for resources 652-658 coinciding in time with transmission 672-678. The UE 502/602 may use the measured RSRP and/or RSRQ to determine a (predicted) SINR for the received/monitored transmissions (signals) if the transmission TRP 670 were to transmit during the reception/monitoring. The UE 502/602 may transmit the measured RSRP, the measured RSRQ (if measured), and/or the calculated SINR to the base station 504/610. In some aspects in which the UE 502 does not calculate the SINR, the determination, at 810, may include calculating the SINR or other interference measures. The determination, at 810, may further include comparing the measured or calculated SI values to a set of threshold values. The threshold values may be static (e.g., for a calculated SINR or RSRQ) or may be dynamic values based on the reported measurements (e.g., for measured IMR RSRP the threshold may be based on measured CMR RSRP). Based on the SIM information received at 808, the base station may determine, at 810, that the set of resources that supports FD SL communications by the first UE is an empty set or a non-empty set. For example, 810 may be performed by SL transmission resource grant determination component 1144 of FIG. 11.

If the set of resources is determined, at 810, to be non-empty, the base station, at 708, may transmit, based on the determined set of resources, a resource grant including at least one of the determined resources to the first UE for transmission of the first SL communication. The determined resources, in some aspects, include the resources identified in the SIM resource grant. In some aspects, the determined resources include any time and frequency resources that can be determined to be non-interfering with existing communications based on the SIM measurements (e.g., any time and frequency resources in a frequency band that was determined to be non-interfering with a set of existing communications with a reception TRP of the UE). Alternatively, if the set of resources is determined, at 810, to be empty, the base station, at 710, may transmit, based on determining that the UE cannot perform FD SL communications, a resource grant to the UE for transmission of the SL communication in an HD mode of operation. For example, the resource grant may include resources that do not overlap in time with transmissions associated with the destination IDs determined at 704. For example, referring to FIG. 5, base station 504 may identify (determine) 526 a set of resources for either FD or HD transmissions from UE 502 and transmit the SL transmission resource grant 528. For example, 710 may be performed by SL transmission resource grant determination component 1144 (e.g., via transmission component 1134) of FIG. 11.

FIG. 9 is a flowchart 900 of a method of wireless communication. The method may be performed by a UE (e.g., the UE 104/402/502/602; the apparatus 1002). At 902, the UE may transmit a request for resources for transmission of a first SL communication to a base station. For example, referring to FIG. 5, UE 502 may transmit SL resource grant request 508 to base station 504. For example, 902 may be performed by SL communication manager 1044 of FIG. 10.

At 904, the UE may receive, from the base station, a set of destination IDs that are associated with the transmission of the first SL transmission. The destination IDs may be a list of candidate destination IDs that includes the destination IDs associated with SL transmission resource grants made by the base station that have not been subsequently released. For example, referring to FIG. 5, UE 502 may receive destination ID list 510 from the base station 504. For semi-statically maintained lists, the UE may not receive the list of destination IDs 510. For example, 904 may be performed (e.g., via reception component 1030) by destination ID association determination component 1040 of SL communication manager 1044 of FIG. 10.

The UE, at 906, may determine based on the received set of destination IDs, a set of one or more destination IDs associated with a set of one or more SL communications received at the first UE. The set of one or more determined destination IDs may be a subset of the destination IDs in the received set of destination IDs. For example, referring to FIG. 5, the UE 502 may identify 512 destination IDs associated with transmissions received/monitored from other UEs (e.g., UE 506). Additionally, or alternatively, each time the UE 502 begins to receive/monitor a transmission, the UE 502 may identify a destination ID associated with the received/monitored transmissions. The UE 502 may also identify a destination ID associated with the particular transmission each time the UE 502 stops receiving/monitoring a particular transmission. For example, 906 may be performed by destination ID association determination component 1040 of SL communication manager 1044 of FIG. 10.

At 908, the UE may transmit an indication of at least one destination ID associated with at least one SL communication received (or monitored) at the first UE to the base station. The UE may transmit the indication of at least one destination ID identified as being associated with at least one transmission received by the UE to the base station via RRC signaling. For example, referring to FIG. 5, the set of destination IDs 514 identified as being associated with transmissions received by the UE 502 (and specifically reception TRP 502a) may be based on the list of destination IDs 510 or based on beginning or ending the reception/monitoring of a particular transmission. In response to a received list of destination IDs, the set of destination IDs 514 may be generated as a new list of destination IDs associated with the transmissions received by the UE 502. Alternatively, the UE may transmit the identified destination IDs 514 as a list of binary values indicating whether or not the UE 502 (and specifically reception TRP 502a) is receiving transmissions associated with a corresponding destination ID in the list of destination IDs 510. For example, 908 may be performed by destination ID association determination component 1040 (e.g., via transmission component 1034) of FIG. 10.

The UE, at 910, may receive a SL resource grant based on the transmitted request and indication from the base station. In some aspects, the SL resource grant is a SI measurement resource grant. The SI measurement resource grant may include CMR information; IMR information; a SL transmission measurement grant; and/or beam directionality information (e.g., SL transmission TCI state and SL reception TCI state). For example, referring to FIGS. 5 and 6, the UE 502/602 may receive SL measurement grant 518/640 that may include CMR information 642; IMR information 644; SL transmission measurement grant 646; and/or beam directionality information in SL transmission TCI and SL reception TCI 648. For example, 910 may be performed by SI measurement and reporting component 1042 of SL communication manager 1044 (e.g., via reception component 1034) of FIG. 10.

At 912, the UE may receive an instruction from the base station to perform SI measurements based on the resource grant for the set of SIM resources. In some aspects, the instruction to perform SI measurements is received, at 910, along with the SI measurement resource grant. For example, referring to FIGS. 5 and 6, the UE 502/602 may receive SL measurement grant 518/640 that may include an instruction to perform the measurements on the granted SI measurement resources. In some aspects, the instruction to perform the SI measurements is implied by the reception of the CMR and IMR information. For example, 912 may be performed by SI measurement and reporting component 1042 of FIG. 10.

The UE, at 914, may measure SI based on the resource grant for the set of SIM resources. For example, referring to FIGS. 5 and 6, UE 502/602 may measure SI at reception (Rx) TRP 502a based on reference signals 522a/522b on CMR and IMR resources 651 and 652-658, respectively, while transmitting reference signals 522b from transmission (Tx) TRP 502b on the resources identified in the IMR (e.g., 672-678). Specifically, the reception (Rx) TRP 502a may receive reference signals 522a from the UE 506 and the reference signals 522b from the transmission (Tx) TRP 502b using different resources in time or both time and frequency (e.g., 652-658) to measure (1) a signal strength (e.g., RSRP or RSRQ) for the reference signals 522a from the UE 506 without the interference from transmission (Tx) TRP 502b and (2) an interference signal strength (e.g., RSRP) from the transmissions 522b from transmission (Tx) TRP 502b without other confounding signals. Additionally, SI measurements may be made regarding the set of reference signals 522b using different frequency resources at a same time resource (e.g., resources 652) to determine if sub-band FD is possible (e.g., if there is interference between transmissions using different allocable frequency resources such as carriers, subcarriers, channels, etc.). For example, 914 may be performed by SI measurement and reporting component 1042 of FIG. 10.

At 916, the UE may transmit information regarding the measured SI based on the resource grant for the set of SIM resources to the base station. The information regarding the measured SI may include a measured RSRP on the identified IMR and CMR, and a measured SINR using a RSRP measured for the CMR as the desired SL "signal" and a RSRP measured for the IMR as the interference. For example, referring to FIGS. 5 and 6, the base station 504 (or 610) may receive the SIM measurement report 524 regarding SI measurements performed by the UE 502 (or 602) may be based on the transmitted SI measurement resource grant 518 (or 640), including CMR 642 and IMR 644. For example, 916 may be performed by SI measurement and reporting component 1042 (e.g., via transmission component 1034) of FIG. 10.

Finally, at 918 the UE may receive a second SL resource grant that is a SL transmission resource grant from the base station based on the transmitted request, at 902, and indication, at 908. In some aspects the SL transmission resource grant is also based on the information regarding the SI measurements transmitted, at 916, to the base station. For example, 918 may be performed by SL communication manager 1044 of FIG. 10.

Figure 10:
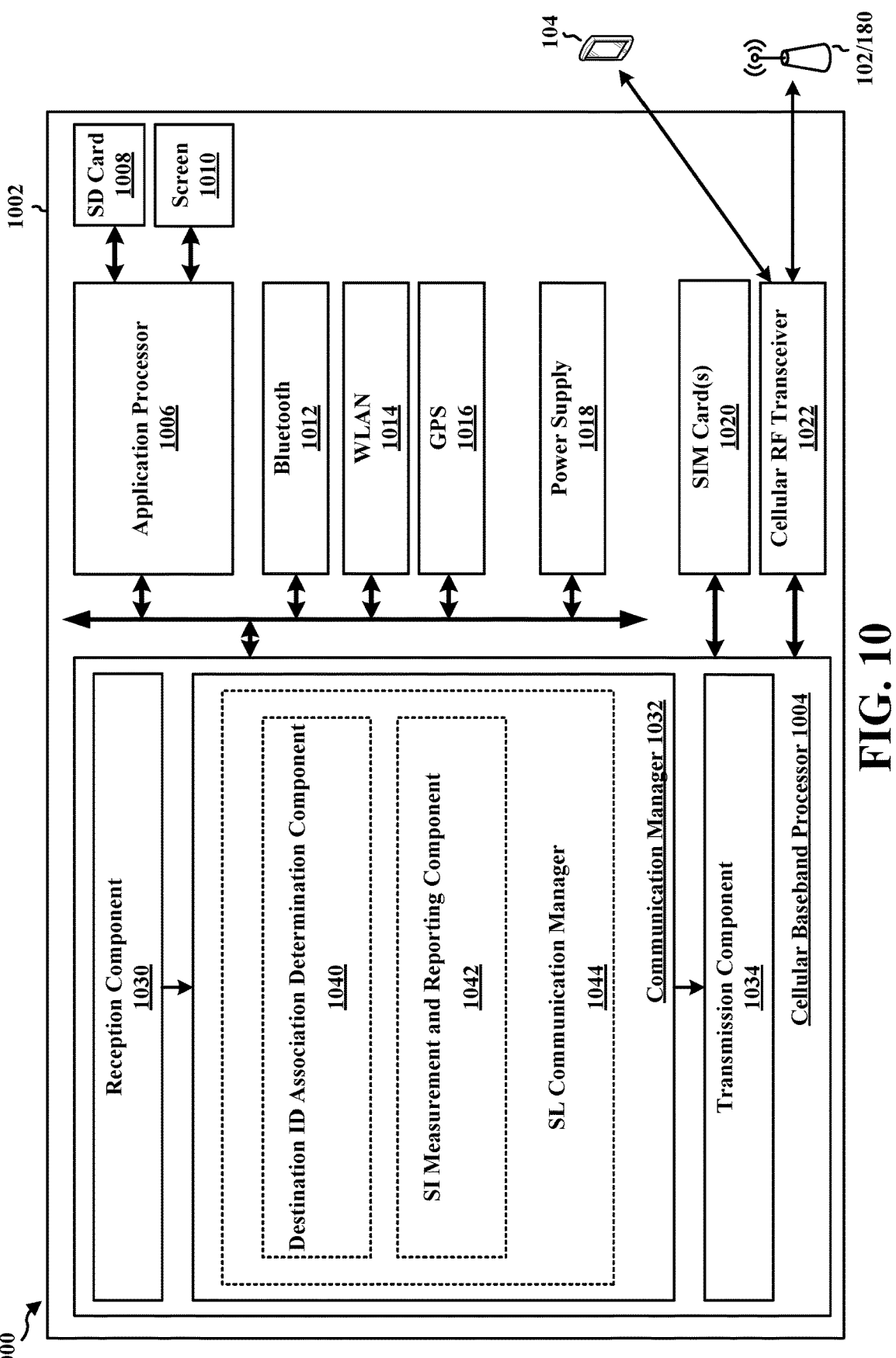
FIG. 10 is a diagram illustrating an example of a hardware implementation for an example apparatus.

FIG. 10 is a diagram 1000 illustrating an example of a hardware implementation for an apparatus 1002. The apparatus 1002 is a UE and includes a cellular baseband processor 1004 (also referred to as a modem) coupled to a cellular RF transceiver 1022 and one or more subscriber identity modules (SIM) cards 1020, an application processor 1006 coupled to a secure digital (SD) card 1008 and a screen 1010, a Bluetooth module 1012, a wireless local area network (WLAN) module 1014, a Global Positioning System (GPS) module 1016, and a power supply 1018. The cellular baseband processor 1004 communicates through the cellular RF transceiver 1022 with the UE 104 and/or BS 102/180. The cellular baseband processor 1004 may include a computer-readable medium/memory. The computer-readable medium/memory may be non-transitory. The cellular baseband processor 1004 is responsible for general processing, including the execution of software stored on the computer-readable medium/memory. The software, when executed by the cellular baseband processor 1004, causes the cellular baseband processor 1004 to perform the various functions described supra. The computer-readable medium/memory may also be used for storing data that is manipulated by the cellular baseband processor 1004 when executing software. The cellular baseband processor 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the cellular baseband processor 1004. The cellular baseband processor 1004 may be a component of the UE 350 and may include the memory 360 and/or at least one of the TX processor 368, the RX processor 356, and the controller/processor 359. In one configuration, the apparatus 1002 may be a modem chip and include just the baseband processor 1004, and in another configuration, the apparatus 1002 may be the entire UE (e.g., see 350 of FIG. 3) and include the aforediscussed additional modules of the apparatus 1002.

The communication manager 1032 includes a SL communication manager 1044 that may be configured to transmit, to a base station, a request for resources for transmission of a first SL communication from the first UE, e.g., as described in connection with 508 and 902 of FIGS. 5 and 9. The SL communication manager 1044 may include a destination ID association determination component 1040 that may be configured to receive, from the base station, a set of destination IDs that are associated with the transmission of the first SL transmission and to determine, based on the received set of destination IDs, a set of one or more destination IDs associated with a set of one or more SL communications received at the first UE, where the set of one or more determined destination IDs is a subset of the destination IDs in the received set of destination IDs and the indicated at least one destination ID is a destination ID in the set of one or more determined destination IDs, e.g., as described in connection with 510/512/514 and 904/906/908 of FIGS. 5 and 9. The destination ID association determination component 1040 may further be configured to transmit an indication of least one determined destination ID associated with at least one SL communication received at the first UE to the base station, e.g., as described in connection with 514 and 908 of FIGS. 5 and 9. The SL communication manager 1044 may further include a SI measurement and reporting component 1042 that receives input in the form of SI measurement resources and that, in some aspects, receives an instruction from the base station to perform SI measurements based on the resource grant for the set of SIM resources from a base station via reception component 1030 based on the set of one or more destination IDs associated with a set of one or more SL communications received at the first UE determined at the destination ID association determination component 1040 and may be configured to measure SI based on the resource grant for the set of SIM resources and provide information (e.g., a SI measurement report) regarding the measured SI based on the resource grant for the set of SIM resources to a base station (e.g., via transmission component 1034), e.g., as described in connection with 518/520/524 and 912/914/916 of FIGS. 5 and 9.

The apparatus may include additional components that perform each of the blocks of the algorithm in the aforementioned flowcharts of FIG. 9. As such, each block in the aforementioned flowcharts of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the cellular baseband processor 1004, includes means for transmitting, to a base station, a request for resources for transmission of a first SL communication from the first UE. The apparatus 1002, and in particular the cellular baseband processor 1004, may further include means for transmitting, to the base station, an indication of at least one destination identifier (ID) associated with at least one SL communication received at the first UE. The apparatus 1002, and in particular the cellular baseband processor 1004, may further include means for receiving, from the base station, a SL resource grant based on the transmitted request and indication. The apparatus 1002, and in particular the cellular baseband processor 1004, may further include means for receiving, from the base station, a set of destination IDs that are associated with the transmission of the first SL transmission. The apparatus 1002, and in particular the cellular baseband processor 1004, may further include means for determining, based on the received set of destination IDs, a set of one or more destination IDs associated with a set of one or more SL communications received at the first UE, where the set of one or more determined destination IDs is a subset of the destination IDs in the received set of destination IDs and the indicated at least one destination ID is a destination ID in the set of one or more determined destination IDs. The apparatus 1002, and in particular the cellular baseband processor 1004, may further include means for receiving an instruction from the base station to perform SI measurements based on the resource grant for a set of SIM resources. The apparatus 1002, and in particular the cellular baseband processor 1004, may further include means for measuring SI based on the resource grant for the set of SIM resources. The apparatus 1002, and in particular the cellular baseband processor 1004, may further include means for transmitting, to the base station, information regarding the measured SI based on the resource grant for the set of SIM resources. The apparatus 1002, and in particular the cellular baseband processor 1004, may further include means for receiving a second SL resource grant for transmission of the first SL communication from the first UE. The aforementioned means may be one or more of the aforementioned components of the apparatus 1002 configured to perform the functions recited by the aforementioned means. As described supra, the apparatus 1002 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 11:
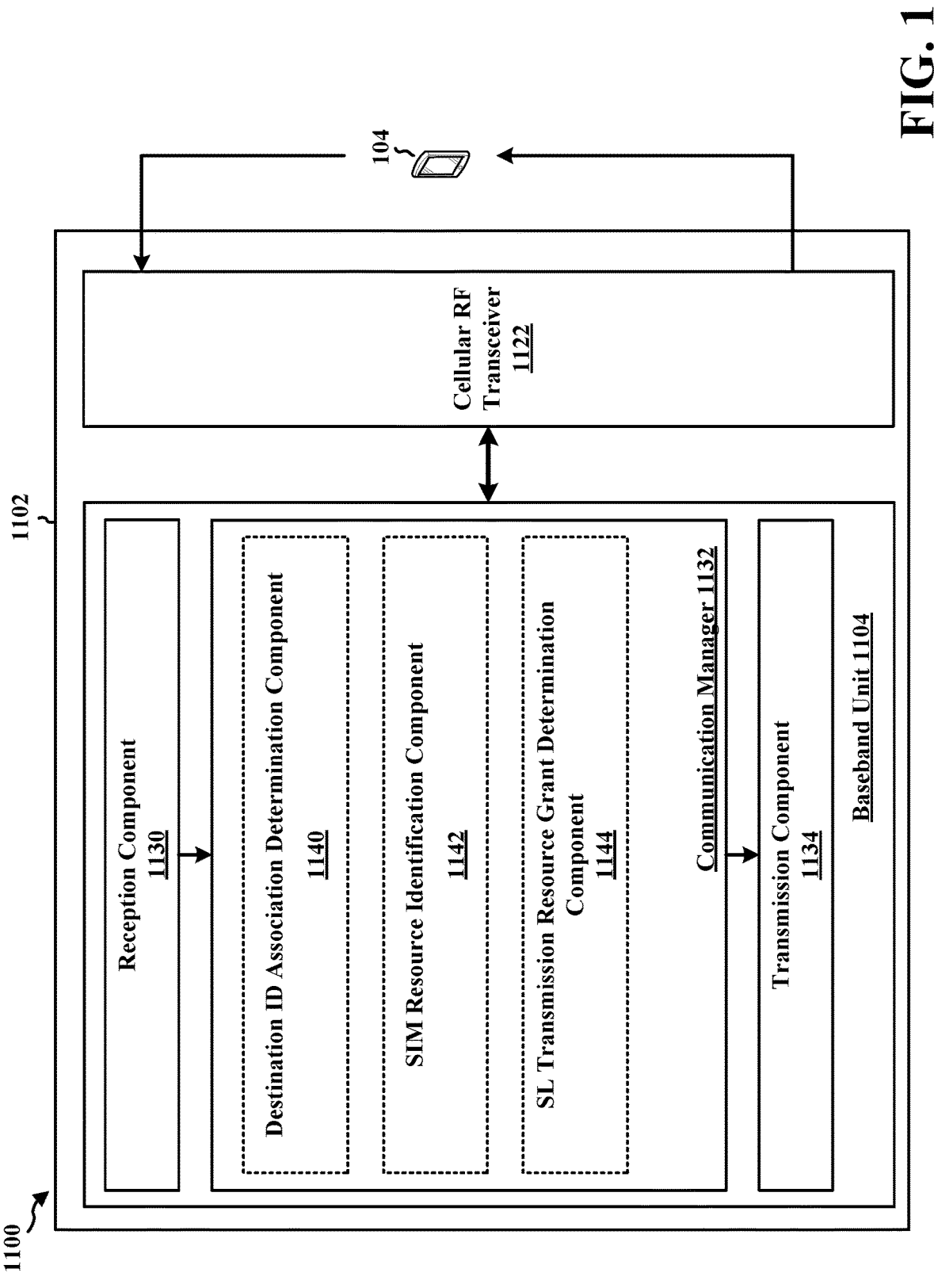
FIG. 11 is a diagram illustrating an example of a hardware implementation for an example apparatus.

FIG. 11 is a diagram 1100 illustrating an example of a hardware implementation for an apparatus 1102. The apparatus 1102 is a BS and includes a baseband unit 1104. The baseband unit 1104 may communicate through a cellular RF transceiver 1122 with the UE 104. The baseband unit 1104 may include a computer-readable medium/memory. The baseband unit 1104 is responsible for general processing, including the execution of software stored on the computer-readable medium/memory. The software, when executed by the baseband unit 1104, causes the baseband unit 1104 to perform the various functions described supra. The computer-readable medium/memory may also be used for storing data that is manipulated by the baseband unit 1104 when executing software. The baseband unit 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the baseband unit 1104. The baseband unit 1104 may be a component of the BS 310 and may include the memory 376 and/or at least one of the TX processor 316, the RX processor 370, and the controller/processor 375.

The communication manager 1132 includes a destination ID association determination component 1140 that may be configured to receive, from a first UE a request for resources for transmission of a first SL communication and determine one or more destination IDs associated with the transmission of the first SL communication by transmitting, to the first UE, a set of destination IDs that are associated with the transmission of the first SL transmission; and receiving, from the first UE, the one or more determined destination IDs associated with the transmission of the first SL transmission, e.g., as described in connection with 508-514, 702/704, and 802/804 of FIGS. 5, 7, and 8. The communication manager 1132 may further include a SIM resource identification component 1142 that may be configured to receive the one or more determined destination IDs associated with the transmission of the first SL transmission from destination ID association determination component 1140, identify a set of SIM resources based on the one or more determined destination IDs associated with the transmission of the first SL transmission, and transmit a resource grant for a set of SIM resources, the resource grant for the set of SIM resources identifying at least one of a set of resources overlapping in time with a first SL resource grant associated with the one or more determined destination IDs or a set of resources overlapping in time and frequency with a second SL resource grant associated with the one or more determined destination IDs, e.g., 706 and 806 of FIGS. 7 and 8. The communication manager 1132 may further include a SL transmission resource grant determination component 1144 that may be configured to determine, based on the one or more determined destination IDs, a set of resources that support FD SL communications by the first UE by receiving, from the first UE, information regarding SI measurements performed by the first UE based on the transmitted resource grant for the set of SIM resources, and determining, based on at least the received information regarding the SI measurements, that the set of resources supports FD SL communications by the first UE, e.g., as described in connection with 706 and 806-810 of FIGS. 7 and 8.

The apparatus may include additional components that perform each of the blocks of the algorithm in the aforementioned flowcharts of FIGS. 7 and 8. As such, each block in the aforementioned flowcharts of FIGS. 7 and 8 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1102, and in particular the baseband unit 1104, includes means for receiving, from a first UE a request for resources for transmission of a first SL communication and determine one or more destination IDs associated with the transmission of the first SL communication. The apparatus 1102, and in particular the baseband unit 1104, may further include means for determining one or more destination IDs associated with the transmission of the first SL communication. The apparatus 1102, and in particular the baseband unit 1104, may further include means for transmitting, to the first UE, a set of destination IDs that are associated with the transmission of the first SL transmission. The apparatus 1102, and in particular the baseband unit 1104, may further include means for receiving, from the first UE, the one or more determined destination IDs associated with the transmission of the first SL transmission. The apparatus 1102, and in particular the baseband unit 1104, may further include means for determining, based on the one or more determined destination IDs, a set of resources that support FD SL communications by the first UE. The apparatus 1102, and in particular the baseband unit 1104, may further include means for transmitting a resource grant for a set of SIM resources, the resource grant for the set of SIM resources identifying at least one of a set of resources overlapping in time with a first SL resource grant associated with the one or more determined destination IDs or a set of resources overlapping in time and frequency with a second SL resource grant associated with the one or more determined destination IDs. The apparatus 1102, and in particular the baseband unit 1104, may further include means for receiving, from the first UE, information regarding SI measurements performed by the first UE based on the transmitted resource grant for the set of SIM resources. The apparatus 1102, and in particular the baseband unit 1104, may further include means for determining, based on at least the received information regarding the SI measurements, that the set of resources supports FD SL communications by the first UE. The apparatus 1102, and in particular the baseband unit 1104, may further include means for transmitting, based on the determined set of resources, a resource grant to the first UE for transmission of the first SL communication, the resource grant comprising at least one resource of the determined set of resources. The apparatus 1102, and in particular the baseband unit 1104, may further include means for receiving, from a second UE, a request for resources for transmission of a second SL communication. The apparatus 1102, and in particular the baseband unit 1104, may further include means for determining at least one destination ID associated with the transmission of the second SL communication. The apparatus 1102, and in particular the baseband unit 1104, may further include means for determining, based on the at least one determined destination ID, that the second UE cannot perform FD SL communications. The apparatus 1102, and in particular the baseband unit 1104, may further include means for transmitting, based on determining that the second UE cannot perform FD SL communications, a second resource grant to the second UE for transmission of the second SL communication, the second resource grant including resources that do not overlap in time with transmissions associated with the at least one determined destination ID. The aforementioned means may be one or more of the aforementioned components of the apparatus 1102 configured to perform the functions recited by the aforementioned means. As described supra, the apparatus 1102 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

In some aspects of wireless communication, e.g., 5G NR, UEs with mTRP are employed to improve reliability, coverage, and capacity performance through flexible deployment scenarios. More specifically, mTRP equipped in different parts of vehicles (as an example of a UE with a mTRP configuration having at least two TRPs separated by a distance of approximately 4-5 meters) may improve reliability in safety and other applications for which high robustness is desired. For some types of transmissions, data coverage may be biased, for example, side coverage may not be as important in certain cases as front or back coverage. Additionally, front, back, or 360-degree coverage may be dependent on packet content/type. For some types of reception, it may be beneficial to have 360-degree coverage which may be achieved by using a first TRP at one end of the vehicle (e.g., a front end) and a second TRP at another end of the vehicle (e.g., a back end) for reception from other UEs.

FD communication can double a link capacity theoretically by enabling radio network nodes to transmit and receive simultaneously on the same frequency and time radio resource. FD may be contrasted with HD communication for which transmission and reception may differ in at least one of time or frequency. Accordingly, a FD network node (e.g., a base station or UE in the cellular network) can communicate simultaneously in UL and DL with two half-duplex panels (e.g., two TRPs of an mTRP configuration) using the same radio resources (radio resources overlapping in time and frequency).

In vehicle-to-anything (V2X) communications, a vehicle equipped with mTRP that is capable of simultaneous transmission and reception using the same time-and-frequency radio resource, may be referred to as a FD-capable UE, and can work in both FD mode and HD mode. However, in FD communication, a UE (e.g., vehicle) may experience self-interference (SI) that may reduce a SINR in two ways (1) by receiving signal directly from the transmitting panel at the reception panel and/or (2) by receiving signal indirectly from the transmitting panel at the reception panel (which may be referred to as cluster interference) due to reflections from surrounding objects. Accordingly, a FD-capable UE may not always operate in FD mode if the SI is too large.

For SL resources allocated by a base station (e.g., SL allocation mode 1) a base station receiving a SL BSR or SR from a transmitting UE may allocate SL resources (e.g., a SL grant) based on the SL-BSR or SR. The base station may then transmit the SL grant via DCI to the requesting UE. However, the base station SL resource grant may not be aware of which UEs (or transmission from UEs) the requesting UE is receiving from (or monitoring) or the intended recipients of the transmission (e.g., UE identities and/or locations). Accordingly, the SL resource grant may conflict with a different SL resource grant to a UE that is an intended recipient of the SL transmission from the requesting UE or that conflicts with a different SL resource grant to a UE that is transmitting to the requesting UE.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is a method of wireless communication of a base station including receiving, from a first UE a request for resources for transmission of a first SL communication; determining one or more destination IDs associated with the transmission of the first SL communication; determining, based on the one or more determined destination IDs, a set of resources that support FD SL communications by the first UE; and transmitting, based on the determined set of resources, a resource grant to the first UE for transmission of the first SL communication, the resource grant comprising at least one resource of the determined set of resources.

Aspect 2 is the method of aspect 1, where determining the one or more destination IDs associated with the transmission of the first SL communication includes transmitting, to the first UE, a set of destination IDs that are associated with the transmission of the first SL transmission; and receiving, from the first UE, the one or more determined destination IDs associated with the transmission of the first SL transmission.

Aspect 3 is the method of aspect 1, where at least one of the set of destination IDs is transmitted to the first UE or the one or more determined destination IDs are received from the first UE via RRC signaling.

Aspect 4 is the method of any of aspects 1 to 3, where determining the set of resources comprises transmitting a resource grant for a set of SIM resources, the resource grant for the set of SIM resources identifying at least one of a set of resources overlapping in time with a first SL resource grant associated with the one or more determined destination IDs or a set of resources overlapping in time and frequency with a second SL resource grant associated with the one or more determined destination IDs.

Aspect 5 is the method of aspect 4, where transmitting the resource grant for the SIM resources comprises transmitting an instruction to the first UE to perform one or more SI measurements based on the SIM resources.

Aspect 6 is the method of any of aspects 4 and 5, where the resource grant for the set of SIM resources comprises at least one of a SL TCI state or a destination ID of the one or more determined destination IDs.

Aspect 7 is the method of any of aspects 4 to 6, where determining the set of resources further includes receiving, from the first UE, information regarding SI measurements performed by the first UE based on the transmitted resource grant for the set of SIM resources; and determining, based on at least the received information regarding the SI measurements, that the set of resources supports FD SL communications by the first UE.

Aspect 8 is the method of aspect 7, where determining that the set of resources supports FD SL communications by the first UE is further based on at least one of a RSRP or a RSRQ for at least one SL communication associated with one of the one or more determined destination IDs.

Aspect 9 is the method of any of aspects 1 to 8, where determining that the set of resources supports FD SL communications by the first UE comprises determining, for each resource in the set of resources, whether the resource supports single-frequency FD communication or sub-band FD communication.

Aspect 10 is the method of any of aspects 1 to 9, where the request is at least one of a SR or a BSR.

Aspect 11 is the method of any of aspects 1 to 10, where the resource grant is a first resource grant, and the method further includes receiving, from a second UE, a request for resources for transmission of a second SL communication; determining at least one destination ID associated with the transmission of the second SL communication; determining, based on the at least one determined destination ID, that the second UE cannot perform FD SL communications; and transmitting, based on determining that the second UE cannot perform FD SL communications, a second resource grant to the second UE for transmission of the second SL communication, the second resource grant including resources that do not overlap in time with transmissions associated with the at least one determined destination ID.

Aspect 12 is a method of wireless communication of a first UE, including transmitting, to a base station, a request for resources for transmission of a first SL communication from the first UE; transmitting, to the base station, an indication of at least one destination ID associated with at least one SL communication received at the first UE; and receiving, from the base station, a SL resource grant based on the transmitted request and indication.

Aspect 13 is the method of aspect 12, further including receiving, from the base station, a set of destination IDs that are associated with the transmission of the first SL transmission; and determining, based on the received set of destination IDs, a set of one or more destination IDs associated with a set of one or more SL communications received at the first UE, where the set of one or more determined destination IDs is a subset of the destination IDs in the received set of destination IDs and the indicated at least one destination ID is a destination ID in the set of one or more determined destination IDs.

Aspect 14 is the method of aspect 13, where at least one of the set of destination IDs is received from the base station or the indication of the at least one destination ID is transmitted to the base station via RRC signaling.

Aspect 15 is the method of any of aspects 13 and 14, where transmitting, to the base station, an indication of at least one destination ID associated with at least one SL communication received at the first UE comprises, for each destination ID in the received set of destination IDs, transmitting a 1-bit indication Aspect 16 is the method of any of aspects 12 to 15, where the SL resource grant comprises a resource grant for a set of SIM resources, the resource grant for the set of SIM resources identifying at least one of a set of resources overlapping in time with a first SL resource grant associated with the indicated at least one destination ID or a set of resources overlapping in time and frequency with a second SL resource grant associated with the indicated at least one destination ID Aspect 17 is the method of aspect 16, further including receiving an instruction from the base station to perform SI measurements based on the resource grant for the set of SIM resources.

Aspect 18 is the method of any of aspects 16 and 17, where the resource grant for the set of SIM resources comprises at least one of a SL TCI state or a destination ID of the one or more determined destination IDs.

Aspect 19 is the method of any of aspects 16 to 18, further including measuring SI based on the resource grant for the set of SIM resources; and transmitting, to the base station, information regarding the measured SI based on the resource grant for the set of SIM resources.

Aspect 20 is the method of aspect 19, where the information regarding the measured SI comprises at least one of a measured RSRP or a measured SINR.

Aspect 21 is the method of aspect 20, where the information regarding the measured SI indicates whether the first UE is capable of full-duplex communication for the first SL transmission and the at least one SL communication received at the first UE.

Aspect 22 is the method of aspect 21, where the received SL resource grant is a first SL resource grant, the method further comprising, receiving a second SL resource grant for transmission of the first SL communication from the first UE.

Aspect 23 is the method of any of aspects 12 to 22, where the request is at least one of a SR or a BSR.

Aspect 24 is an apparatus for wireless communication including at least one processor coupled to a memory and configured to implement a method as in any of aspects 1 to 23.

Aspect 25 is an apparatus for wireless communication including means for implementing a method as in any of aspects 1 to 23.

Aspect 26 is a computer-readable medium storing computer executable code, where the code when executed by a processor causes the processor to implement a method as in any of aspects 1 to 23.

What is claimed is:

1. A method of wireless communication of a base station, comprising:
   receiving, from a first user equipment (UE) a request for resources for transmission of a first sidelink (SL) communication;

determining one or more destination identifiers (IDs) associated with the transmission of the first SL communication, wherein determining the one or more destination IDs associated with the transmission of the first SL communication comprises:
   transmitting, to the first UE, a set of destination IDs that are associated with the transmission of the first SL communication; and
   receiving, from the first UE, one or more of the destination IDs associated with the transmission of the first SL communication that are determined by the UE to have been monitored and/or decoded by the UE;
transmitting, to the first UE, a first resource grant for a set of identified self-interference (SI) measurement (SIM) resources, the set of identified SIM resources being based on first information regarding the received one or more of the destination IDs;
receiving, from the first UE, an SI measurement report including second information regarding SI measurements performed by the first UE based on the first resource grant for the set of SIM resources;
determining, based on at least the second information regarding the SI measurements, that the set of resources supports full-duplex (FD) SL communications by the first UE;
determining, based on the set of resources supporting FD SL, a set of resources that support FD SL communications by the first UE; and
transmitting, based on the determined set of resources, a second resource grant to the first UE for the transmission of the first SL communication, the second resource grant comprising at least one resource of the determined set of resources.

2. The method of claim 1, wherein at least one of (1) the set of destination IDs is transmitted to the first UE or (2) the one or more determined destination IDs are received from the first UE via radio resource control (RRC) signaling.

3. The method of claim 1, wherein transmitting the resource grant for the SIM resources comprises transmitting an instruction to the first UE to perform one or more SI measurements based on the SIM resources.

4. The method of claim 1, wherein the resource grant for the set of SIM resources comprises at least one of a SL transmission configuration indicator (TCI) state or a destination ID of the one or more determined destination IDs.

5. The method of claim 1, wherein determining that the set of resources supports FD SL communications by the first UE is further based on at least one of a reference signal received power (RSRP) or a reference signal received quality (RSRQ) for at least one SL communication associated with one of the one or more determined destination IDs.

6. The method of claim 1, wherein determining that the set of resources supports FD SL communications by the first UE comprises determining, for each resource in the set of resources, whether the resource supports single-frequency FD communication or sub-band FD communication.

7. The method of claim 1, wherein the request is at least one of a scheduling request (SR) or a buffer status report (BSR).

8. The method of claim 1, wherein the method further comprises:
   receiving, from a second UE, a second request for resources for transmission of a second SL communication;
   determining at least one destination ID associated with the transmission of the second SL communication;

determining, based on the at least one determined destination ID, that the second UE cannot perform FD SL communications; and transmitting, based on determining that the second UE cannot perform FD SL communications, a third resource grant to the second UE for the transmission of the second SL communication, the third resource grant including granted resources that do not overlap in time with transmissions associated with the at least one determined destination ID.

9. A method of wireless communication of a first user equipment (UE), comprising:

transmitting, to a base station, a request for resources for transmission of a first sidelink (SL) communication from the first UE;

receiving, from the base station, a set of destination identifiers (IDs) that are associated with the transmission of the first SL communication;

determining, based on the received set of destination IDs, a set of one or more destination IDs associated with a set of one or more SL communications received at the first UE, wherein the set of one or more determined destination IDs is a subset of the destination IDs in the received set of destination IDs;

transmitting, to the base station, an indication of at least one destination ID, wherein the indication of the at least one destination ID is a destination ID in the set of one or more determined destination IDs;

receiving, from the base station, a first resource grant for a set of identified self-interference (SI) measurement (SIM) resources, the set of identified SIM resources being based on first information regarding the indicated at least one determined destination ID;

transmitting, to the base station, an SI measurement report including second information regarding SI measurements performed by the first UE based on the first resource grant for the set of SIM resources, wherein the second information regarding the SI measurements indicates that the first UE is capable of full-duplex (FD) communication for the first SL communication and the at least one SL communication received at the first UE; and receiving, from the base station, a SL resource grant based on the transmitted request and the indication of the at least one destination ID.

10. The method of claim 9, further comprising: receiving an instruction from the base station to perform the SI measurements based on the resource grant for the set of SIM resources.

11. The method of claim 9, wherein the resource grant for the set of SIM resources comprises at least one of a SL transmission configuration indicator (TCI) state or a destination ID of the at least one indicated destination ID.

12. The method of claim 9, wherein the information regarding the measured SI comprises at least one of a measured reference signal received power (RSRP) or a measured signal-to-interference and noise ratio (SINR).

13. The method of claim 9, wherein the request is at least one of a scheduling request (SR) or a buffer status report (BSR).

14. An apparatus for wireless communication, comprising:

memory; and at least one processor coupled to the memory and configured to:

receive, from a first user equipment (UE) a request for resources for transmission of a first sidelink (SL) communication;

determine one or more destination identifiers (IDs) associated with the transmission of the first SL communication, wherein to determine the one or more destination IDs associated with the transmission of the first SL communication the at least one processor is configured to:

transmit, to the first UE, a set of destination IDs that are associated with the transmission of the first SL communication; and receive, from the first UE, one or more of the destination IDs associated with the transmission of the first SL communication that are determined by the UE to have been monitored and/or decoded by the UE;

transmit, to the first UE, a first resource grant for a set of identified self-interference (SI) measurement (SIM) resources, the set of identified SIM resources being based on first information regarding the received one or more of the destination IDs;

receive, from the first UE, an SI measurement report including second information regarding SI measurements performed by the first UE based on the first resource grant for the set of SIM resources;

determine, based on at least the second information regarding the SI measurements, that the set of resources supports full-duplex (FD) SL communications by the first UE;

determine, based on the set of resources supporting FD SL, a set of resources that support FD SL communications by the first UE; and transmit, based on the determined set of resources, a second resource grant to the first UE for the transmission of the first SL communication, the second resource grant comprising at least one resource of the determined set of resources.

15. An apparatus for wireless communication, comprising:

memory; and at least one processor coupled to the memory and configured to:

transmit, to a base station, a request for resources for transmission of a first sidelink (SL) communication from a first UE;

receive, from the base station, a set of destination IDs that are associated with the transmission of the first SL communication;

determine, based on the received set of destination IDs, a set of one or more destination IDs associated with a set of one or more SL communications received at the first UE, wherein the set of one or more determined destination IDs is a subset of the destination IDs in the received set of destination IDs;

transmit, to the base station, an indication of at least one destination ID, wherein the indication of the at least one destination ID is a destination ID in the set of one or more determined destination IDs;

receive, from the base station, a resource grant for a set of identified self-interference (SI) measurement (SIM) resources, the set of identified SIM resources being based on information regarding the indicated at least one determined destination IDs;

transmit, to the base station, an SI measurement report including second information regarding SI measurements performed by the first UE based on the transmitted resource grant for the set of SIM resources, wherein the second information regarding the SI measurements indicates that the first UE is capable of full-duplex (FD) communication for the first SL communication and the at least one SL communication received at the first UE; and receive, from the base station, a SL resource grant based on the transmitted request and the indication of the at least one destination ID.

16. The apparatus of claim 15, wherein the resource grant for the set of SIM resources identifies a set of resources overlapping in at least one of time or frequency with a first SL resource grant associated with the indicated at least one destination ID and the at least one processor is further configured to:

measure SI based on the resource grant for the set of SIM resources.

* * * * *